US011469834B2

(12) United States Patent
Cui et al.

(10) Patent No.: US 11,469,834 B2
(45) Date of Patent: Oct. 11, 2022

(54) RADIO LINK MONITORING (RLM) EVALUATION MECHANISM FOR NEW RADIO (NR) SYSTEMS

(71) Applicant: Apple Inc., Cupertino, CA (US)

(72) Inventors: Jie Cui, Santa Clara, CA (US); Yang Tang, San Jose, CA (US); Hua Li, Beijing (CN); Manasa Raghavan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/158,767

(22) Filed: Oct. 12, 2018

(65) Prior Publication Data

US 2019/0052380 A1    Feb. 14, 2019

Related U.S. Application Data

(60) Provisional application No. 62/572,326, filed on Oct. 13, 2017.

(51) Int. Cl.
*H04B 17/318* (2015.01)
*H04W 48/12* (2009.01)
*H04L 5/00* (2006.01)
*H04W 24/10* (2009.01)

(52) U.S. Cl.
CPC ......... *H04B 17/318* (2015.01); *H04L 5/0048* (2013.01); *H04W 48/12* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2011/0256861 A1* | 10/2011 | Yoo | H04B 17/327 |
| | | | 455/423 |
| 2018/0262313 A1* | 9/2018 | Nam | H04L 5/005 |
| 2019/0081675 A1* | 3/2019 | Jung | H04W 56/001 |
| 2019/0081684 A1* | 3/2019 | da Silva | H04W 72/0446 |
| 2019/0200249 A1* | 6/2019 | Yoon | H04W 24/10 |
| 2019/0215790 A1* | 7/2019 | Kim | H04W 56/001 |
| 2019/0349960 A1* | 11/2019 | Li | H04W 72/1242 |
| 2019/0380075 A1* | 12/2019 | Ugurlu | H04W 72/085 |

OTHER PUBLICATIONS

Ohara "LS on in-sync/out-of-sync BLER for RLM," 3GPP TSG RAN WG1 Meeting NR Ad-hoc#3, R1-1716917, Sep. 18-21, 2017, Nagoya, Japan, 1 page.
Ohara, "[DRAFT] LS on in-sync/out-of-sync BLER for RLM," 3GPP TSG RAN WG1 Meeting NR Ad-hoc#3, R1-1716862, Sep. 18-21, 2017, Nagoya, Japan, 1 page.
Intel Corporation, "Technical Specification Group Radio Access Network; New Radio(NR); Requirements for support of radio resource management (Release 15)," TS 38.133 V0.2.0 (Sep. 2017), 3GPP TSG-RAN WG4 meeting #AH3, R4-1709413, Agenda item: 3.5.1, Sep. 18-21, 2017, Nagoya, Japan, 16 pages.
3GPP, "Technical Specification Group Radio Access Network; Evolved Universal Terrestrial Radio Access (E-UTRA); Requirements for support of radio resource management (Release 15)," 3GPP TS 36.133 V15.0.0 (Sep. 2017), 5G, 2663 pages.

* cited by examiner

*Primary Examiner* — Mohammad S Adhami
(74) *Attorney, Agent, or Firm* — Sterne, Kessler, Goldstein & Fox P.L.L.C.

(57) ABSTRACT

Methods, systems, and storage media are described for radio link monitoring (RLM) for new radio (NR). Other embodiments may be described and/or claimed.

23 Claims, 12 Drawing Sheets

400

405
Generating a signal containing an indication that a radio link monitoring-reference signal (RLM-RS) and a physical downlink control channel (PDCCH) signal are both configured with a first beamforming configuration for an evaluation period

410
Transmitting or causing to transmit the signal over a network to a user equipment (UE) to cause the UE to evaluate the RLM-RS for the evaluation period based on the first beamforming configuration

FIG. 4

RADIO LINK MONITORING (RLM) EVALUATION MECHANISM FOR NEW RADIO (NR) SYSTEMS

RELATED APPLICATION

The present application claims priority under 35 U.S.C. § 119 to: U.S. Provisional Application No. 62/572,326 filed Oct. 13, 2017, the contents of which are hereby incorporated by reference in their entirety.

FIELD

Various embodiments of the present application generally relate to the field of wireless communications, and in particular, to radio link monitoring (RLM) evaluation for new radio (NR).

BACKGROUND

In New Radio (NR) systems, radio link monitoring (RLM) may be used to monitor radio link quality. For example, a user equipment (UE) may monitor the downlink radio quality of a primary cell (PCell) and primary secondary cell (PSCell).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1, 2, 3, and 4 illustrate examples of operation flow/algorithmic structures in accordance with some embodiments.

DETAILED DESCRIPTION

Figure 1:
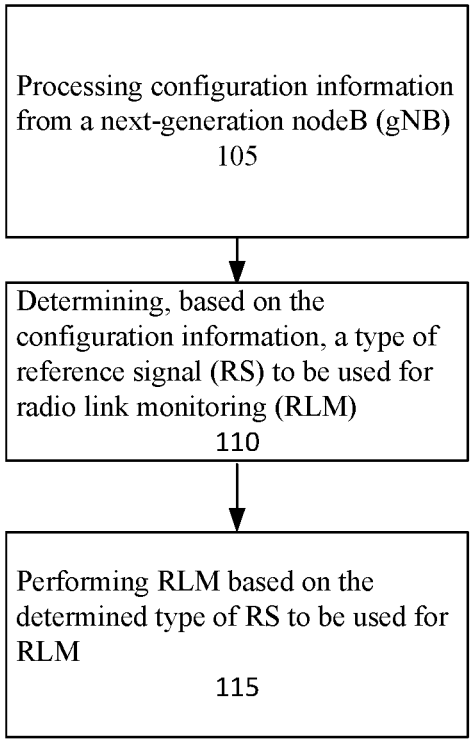

Embodiments discussed herein may relate to radio link monitoring (RLM) for new radio (NR). Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be rearranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Radio Link Monitoring (RLM)

Radio Link Monitoring (RLM) is a procedure to monitor the quality level of a radio link, such as a physical downlink control channel (PDCCH) transmission in new radio (NR). In some embodiments, the quality level of the PDCCH transmission can be determined by comparing the PDCCH transmission to a hypothetical PDCCH transmission. Among other things, RLM may help detect whether the radio link is in-synchronization (IS) or out-of-synchronization (OOS).

As described in more detail herein, a UE may be configured to perform RLM to help determine the quality level of radio link. Among other things, RLM may be used to help reduce UE service interruptions by (for example) reducing the number of radio link failures (RLFs) declared. In some embodiments, radio link transmission quality can be determined by comparing a selected RLM reference signal (RS), also referred to herein as RLM-RS to a hypothetical PDCCH transmission. Examples of RLM-RS that may be used in conjunction with embodiments of the present disclosure include synchronization signal blocks (SSBs) or a channel state information-reference signal (CSI-RS).

A variety of parameters can be used for RLM, such as a threshold value at which the PDCCH transmission cannot be reliably received or a threshold value at which the PDCCH transmission can be received more reliably. For example, two thresholds may be defined in tracking the radio link conditions, such as: Qin and Qout. In this example, a first threshold (Qin) may correspond to a first block error rate (BLER) of a hypothetical PDCCH that indicates an in-sync condition of the radio link, while a second threshold (Qout) may correspond to a second BLER that indicates an out-of-sync condition of the radio link. The first threshold may comprise a lower BLER than the second threshold, e.g., the first threshold may comprise a 10% BLER, whereas the second threshold may comprise a 2% BLER. These thresholds may be based on parameters of a hypothetical PDCCH transmission.

According to various embodiments disclosed herein, New Radio (NR) systems may include a variety of radio link monitoring (RLM) mechanisms. In one embodiment, for example, a single in-synchronization (IS) or out-of-synchronization (OOS) parameter is reported by the UE for a cell group. Additionally, for the cell group, a single IS block error rate (BLER) may be configured for a UE at a time, and a single OOS BLER is configured for a UE at a time. The single IS/OOS BLERs may be configurable from two pairs of values for IS/OOS BLERs, and detailed pairs of values may likewise be determined. In some embodiments, the configuration may be an explicit radio resource configuration (RRC) configuration or implicitly derived from other parameters.

Some embodiments may operate in conjunction with Ultra-Reliable and Low Latency Communications (URLLC) or massive Machine Type Communications (mMTC). The two pairs of values for IS/OOS BLERs may be used in use cases such as, but not limited to, Voice over IP (VoIP) or enhanced Mobile Broadband (eMBB).

In some embodiments, the UE may be configured to perform RLM on one or multiple RLM-reference signal (RS) resource(s), and periodic IS may be indicated if the estimated link quality corresponding to a hypothetical Physical Downlink Control Channel (PDCCH) BLER (based on at least Y=1 RLM-RS resource among all configured X RLM-RS resources) is above a particular threshold (e.g., "Q_in"). In some embodiments, the interference measurement resource related to the estimated link quality may correspond to a PDCCH BLER.

In some embodiments, the RLM-RS may be undefined until explicitly/implicitly configured. In such cases, the network may configure the RLM-RS for the UE to perform RLM.

According to various embodiments, when synchronization signal blocks (SSBs) are used as RLM-RS, a set of SSBs may be explicitly configured by RRC. Similarly, when CSI-RS is used as RLM-RS, a set of CSI-RS resources may be explicitly configured as RLM RS by RRC. In some embodiments, a subset of CSI-RS resources configured for beam management (BM) (e.g., a "P1" beam) may be configured as RLM-RS.

In some embodiments, hypothetical PDCCH transmission parameters may be based on typical scheduling parameters for IN/OOS conditions, including parameters such as downlink control information (DCI) format, aggregation level, and power boost. Other parameters may be included as well.

In some embodiments, BLER levels may be used to derive radio link quality thresholds (e.g., "Qin" and "Qout") based, for example, on a network configuration (e.g., the configured pair of IN/OOS BLER). In a particular example, one pair of BLER values may be: ([10%], [2%]) for (Qout, Qin).

In some embodiments, the evaluation period for RLM may be determined based on link level simulation. In some embodiments, the periodicity of the IN/OOS indication may be the measurement interval for RLM monitoring.

In some embodiments, the UE may be able to monitor one or more RLM-RS resources at least for SSB-based RLM. Embodiments of the present disclosure may utilize any suitable number of SSBs or PDCCHs for RLM.

A reference signal (RS) for RLM evaluation, which may also be referred to as an "RLM-RS," may be a synchronization sequence block (SSB) or channel state information (CSI)-RS, and the evaluation of the reference signal may be mapped to a hypothetical PDCCH of RLM. In NR, the network may operate in conjunction with a variety of different transmission parameters, and embodiments of the present disclosure may align the transmission parameters of a RS for RLM and a hypothetical PDCCH of RLM.

In some embodiments, an evaluation of an RLM-RS (e.g., SSB and/or CSI-RS) may be used to reflect a quality of the connection between a UE and a gNB. This evaluation may produce a signal quality metric, e.g., an effective signal to interference plus noise ratio (SINR), which can then be mapped to a BLER of a hypothetical PDCCH. The hypothetical PDCCH may be a cell-specific PDCCH, a UE-specific PDCCH, or a machine type communication PDCCH (MPDCCH). The BLER of the hypothetical PDCCH may then be used to judge an OOS (out-of-sync) or IN (in-sync) state. In some embodiments, in order to make the channel condition of the RLM-RS similar to the hypothetical PDCCH as much as possible, the beamforming configuration for RLM-RS and the hypothetical PDCCH may be same and may involve both network configuration and UE behavior.

The beamforming configuration for the RLM-RS and the hypothetical PDCCH may include next generation NodeB (gNB) transmit (Tx) beamforming configuration information and/or UE receive (Rx) beamforming configuration information (e.g., gNB Tx beamforming pattern/index and/or UE Rx beamforming pattern/index).

In embodiments, a network (e.g., a gNB) may configure an identical Tx the identical Tx beamforming for RLM-RS and a hypothetical PDCCH within a time period. For example, the identical Tx beamforming may include an identical Tx beamforming configuration (e.g., Tx beamforming pattern), and the time period may be one time slot, one subframe, or another time unit. The UE may then assume the Tx beamforming is the same for the RLM-RS and the hypothetical PDCCH in the time period for purposes of RLM evaluation.

In embodiments, the UE may use an identical Rx beamforming for RLM-RS and a hypothetical PDCCH within a time period. For example, the identical Rx beamforming may include an identical Rx beamforming configuration (e.g., Rx beamforming pattern), and the time period may be one time slot, one subframe, or other time unit. For example, UE can use the identical Rx beamforming pattern for RLM-RS as hypothetical PDCCH within in a time slot for RLM evaluation. In other words, the direction of the Rx beams for RLM-RS and hypothetical PDCCH may be the same.

In embodiments, the network may indicate which RLM-RS and PDCCH are configured with identical Tx beamforming, and the UE may use identical Rx beamforming for those RLM-RS and hypothetical PDCCH configured with identical Tx beamforming. The identical Tx/Rx beamforming may include an identical Tx/Rx beamforming configuration (e.g., Tx/Rx beamforming pattern).

For example, if a gNB indicates to a UE that the RLM-RS on time slot #i has an identical Tx beamforming configuration as PDCCH on time slot #j, then the UE will use the same Rx beamforming pattern for RLM-RS on slot #i and for PDCCH on slot #j. In another example, if the gNB indicates to the UE that the RLM-RS on time slot #i is configured with an identical Tx beamforming as PDCCH on the time slot which is k time slots after slot #i, then the UE will use the same Rx beamforming pattern for RLM-RS on slot #i and for PDCCH on slot #(i+k+l).

In embodiments, the network may indicate information regarding the RLM-RS to be used for RLM evaluation. This information may include, for example, the kind of RS that is to be used for RLM evaluation, a slot or symbol associated with an RS that is to be used for RLM evaluation, an index associated with an RS that is to be used for RLM evaluation, or the top "X" RSs that are to be used for RLM evaluation (e.g., the top "X" RSs may be the RSs with highest Reference Signal Received Powers (RSRPs), where X is an integer).

For example, a gNB may provide information to the UE to indicate that an SSB or CSI-RS is to be used as the RLM-RS. If an SSB is to be used as an RLM-RS, some embodiments may provide that the information is to configure a UE with an indication to perform an RLM evaluation on some of the SSBs, but not others. This indication may include a bitmap. In a particular example, "110000" may be used for the case of six SSBs, where "1" means the SSB can be used for RLM, and "0" means the SSB cannot be used for RLM. Accordingly, the bitmap above indicates that the first two SSBs can be used for RLM and other four SSBs cannot be used for RLM.

In another example, a gNB may configure a UE to perform RLM evaluation on a top X number of SSBs which have the highest Reference Signal Received Power (RSRP) or Reference Signal Received Quality (RSRQ). In a particular example eight SSBs with the highest RSRP may be identified, such that the UE will perform RLM on the top 8 highest SSBs having the highest RSRP.

In some embodiments, a gNB may have a threshold to filter the unreliable RLM-RS. For example, the RSRP threshold may be Y dBm (where Y is a threshold value) and RLM can be performed with top 8 SSBs whose RSRP are higher than the Y dBm threshold. In this example, if the number of SSBs whose RSRP are higher than Y dBm is less than 8, then the UE may only perform RLM on those SSBs above the threshold.

In some embodiments, the electronic device(s), network (s), system(s), chip(s) or component(s), or portions or implementations thereof, of FIGS. 5-12 herein may be configured to perform or execute one or more operation flow/algorithmic structures, processes, techniques, or methods as described herein, or portions thereof, including the operation flow/algorithmic structures illustrated in FIGS. 1-4.

One example of an operation flow/algorithmic structure is depicted in FIG. 1, which may be performed by a UE in accordance with some embodiments. In this example, operation flow/algorithmic structure 100 may include, at 105, processing configuration information from a next-generation nodeB (gNB).

The configuration information may include a variety of parameters. For example, the configuration information may to indicate a slot, symbol, or index of an RS to be used for RLM. The configuration information may also indicate a number of RSs, which have a highest reference signal receive power (RSRP), that are to be used for RLM. The configuration information may further include a bitmap to indicate synchronization signal blocks (SSBs) that are to be used for RLM.

Operation flow/algorithmic structure 100 may further include, at 110, determining, based on the configuration information, a type of reference signal (RS) to be used for radio link monitoring (RLM). For example, the RS for RLM may be a synchronization signal block (SSB) or a channel state information-reference signal (CSI-RS). Operation flow/algorithmic structure 100 may further include, at 115, performing RLM based on the determined type of RS to be used for RLM.

Figure 2:
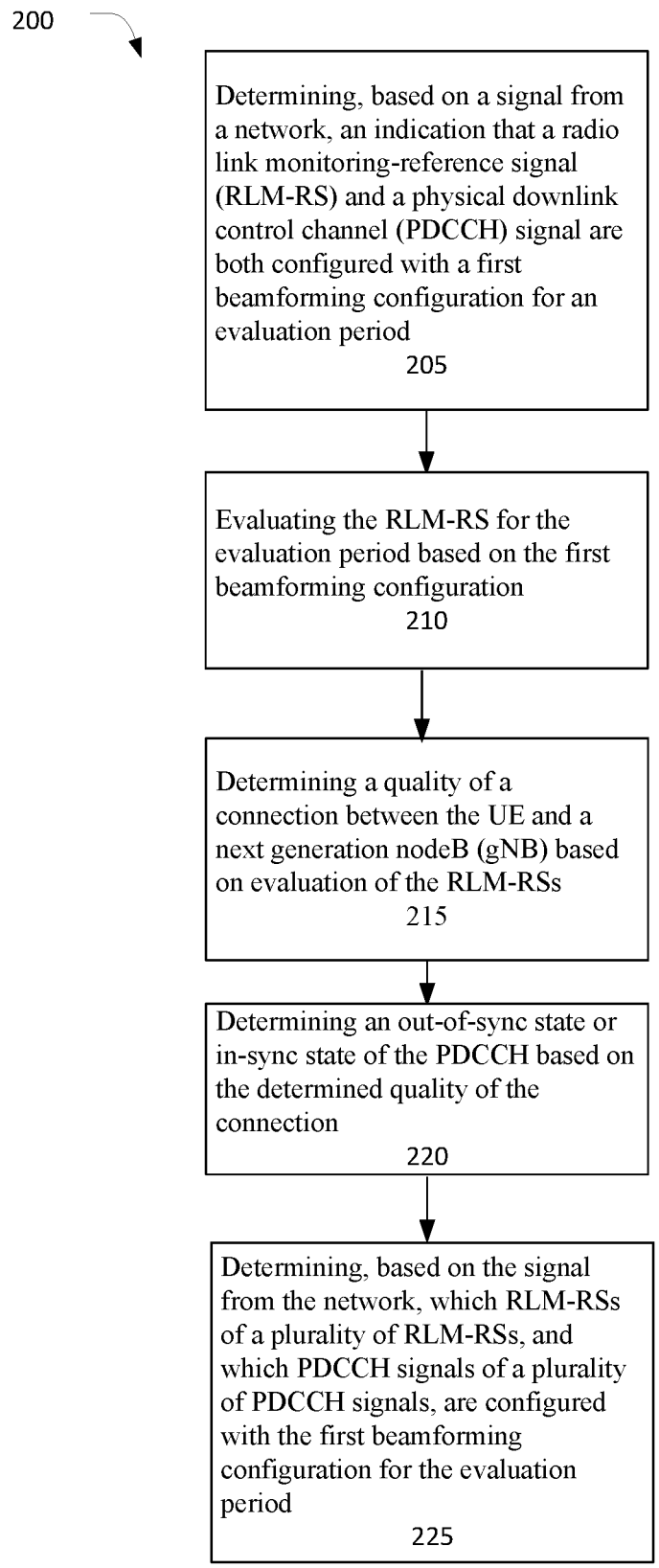

Another example of an operation flow/algorithmic structure is depicted in FIG. 2, which may be performed by a UE in accordance with some embodiments. In this example, operation flow/algorithmic structure 200 may include, at 205, determining, based on a signal from a network, an indication that a RLM-RS and a PDCCH signal are both configured with a first beamforming configuration for an evaluation period. In some embodiments, the PDCCH may be a cell-specific PDCCH, a UE-specific PDCCH, or a machine-type communications physical downlink control channel (MPDCCH). In some embodiments, the RLM-RS is a SSB or a CSI-RS.

In some embodiments, the first beamforming configuration is a transmit beamforming configuration associated with a next generation nodeB (gNB) of the network. In some embodiments, the first beamforming configuration is a receive beamforming configuration associated with the UE.

Operation flow/algorithmic structure 200 may further include, at 210, evaluating the RLM-RS for the evaluation period based on the first beamforming configuration. Embodiments of the present disclosure may utilize evaluation periods of different lengths and units. For example, the evaluation period may be at least one subframe, or at least one time slot.

Operation flow/algorithmic structure 200 may further include, at 215, determining a quality of a connection between the UE and a next generation nodeB (gNB) based on evaluation of the RLM-RSs. Operation flow/algorithmic structure 200 may further include, at 220, determining an out-of-sync state or in-sync state of the PDCCH based on the determined quality of the connection.

Operation flow/algorithmic structure 200 may further include, at 225, determining, based on the signal from the network, which RLM-RSs of a plurality of RLM-RSs, and which PDCCH signals of a plurality of PDCCH signals, are configured with the first beamforming configuration for the evaluation period.

Figure 3:
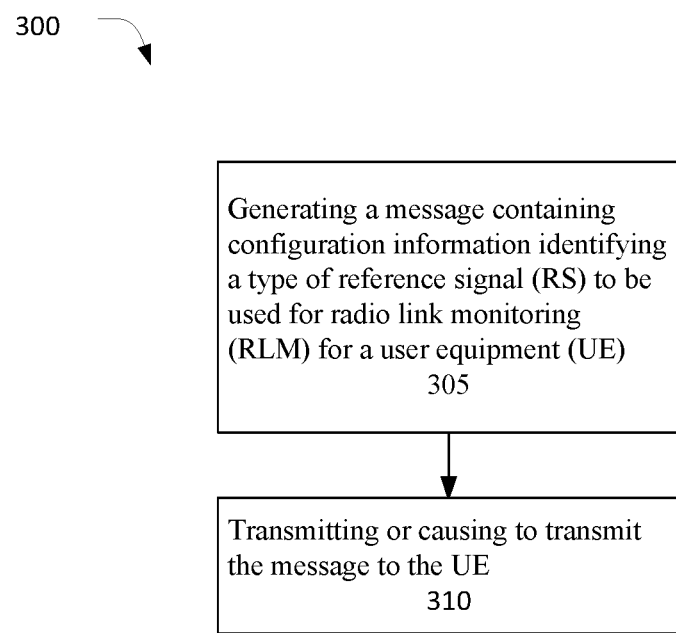

Another example of an operation flow/algorithmic structure is depicted in FIG. 3, which may be performed by a gNB in accordance with some embodiments. In this example, operation flow/algorithmic structure 300 may include, at 305, generating a message containing configuration information identifying a type of RS to be used for radio link monitoring (RLM) for a user equipment (UE) and, at 310, transmitting or causing to transmit the message to the UE.

In some embodiments, the RS is an SSB or a CSI-RS. The configuration information may include a variety of parameters. For example, the configuration information may to indicate a slot, symbol, or index of an RS to be used for RLM. The configuration information may also indicate a number of RSs, which have a highest reference signal receive power (RSRP), that are to be used for RLM. The configuration information may further include a bitmap to indicate SSBs that are to be used for RLM.

Another example of an operation flow/algorithmic structure is depicted in FIG. 4, which may be performed by a gNB in accordance with some embodiments. In this example, operation flow/algorithmic structure 400 may include, at 405, generating a signal containing an indication that a radio link monitoring-reference signal (RLM-RS) and a physical downlink control channel (PDCCH) signal are both configured with a first beamforming configuration for an evaluation period.

In some embodiments, the RLM-RS may be a synchronization signal block (SSB) or a channel state information-reference signal (CSI-RS). In some embodiments, the PDCCH may be a cell-specific PDCCH, a UE-specific PDCCH, or a machine-type communications physical downlink control channel (MPDCCH).

Operation flow/algorithmic structure 400 may further include, at 410, transmitting or causing to transmit the signal over a network to a user equipment (UE) to cause the UE to evaluate the RLM-RS for the evaluation period based on the first beamforming configuration. In some embodiments, the first beamforming configuration is a transmit beamforming configuration associated with a gNB of the network or a receive beamforming configuration associated with the UE. In some embodiments, the evaluation period is at least one subframe or at least one time slot.

Figure 5:
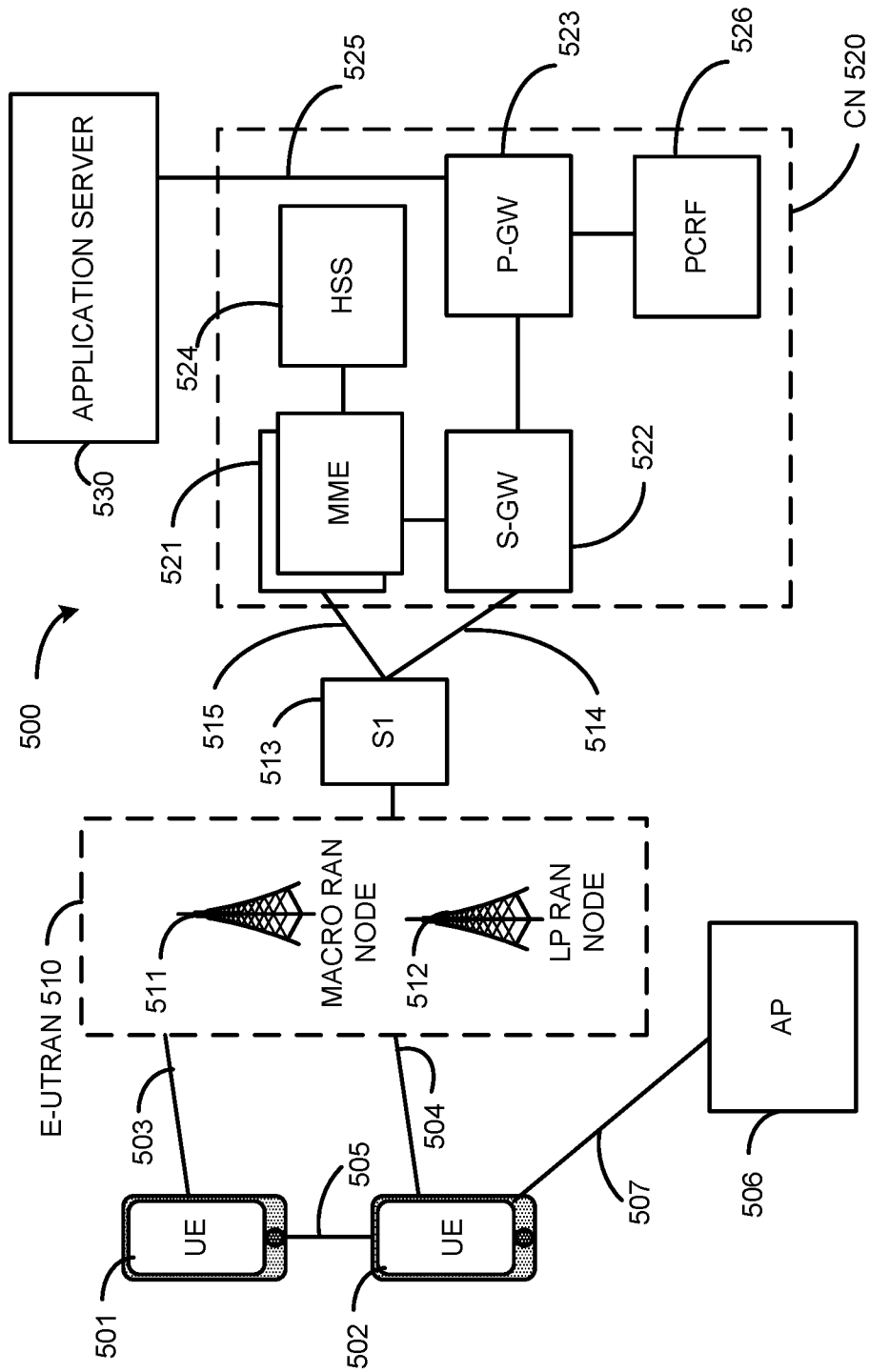
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching.

Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE' s IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
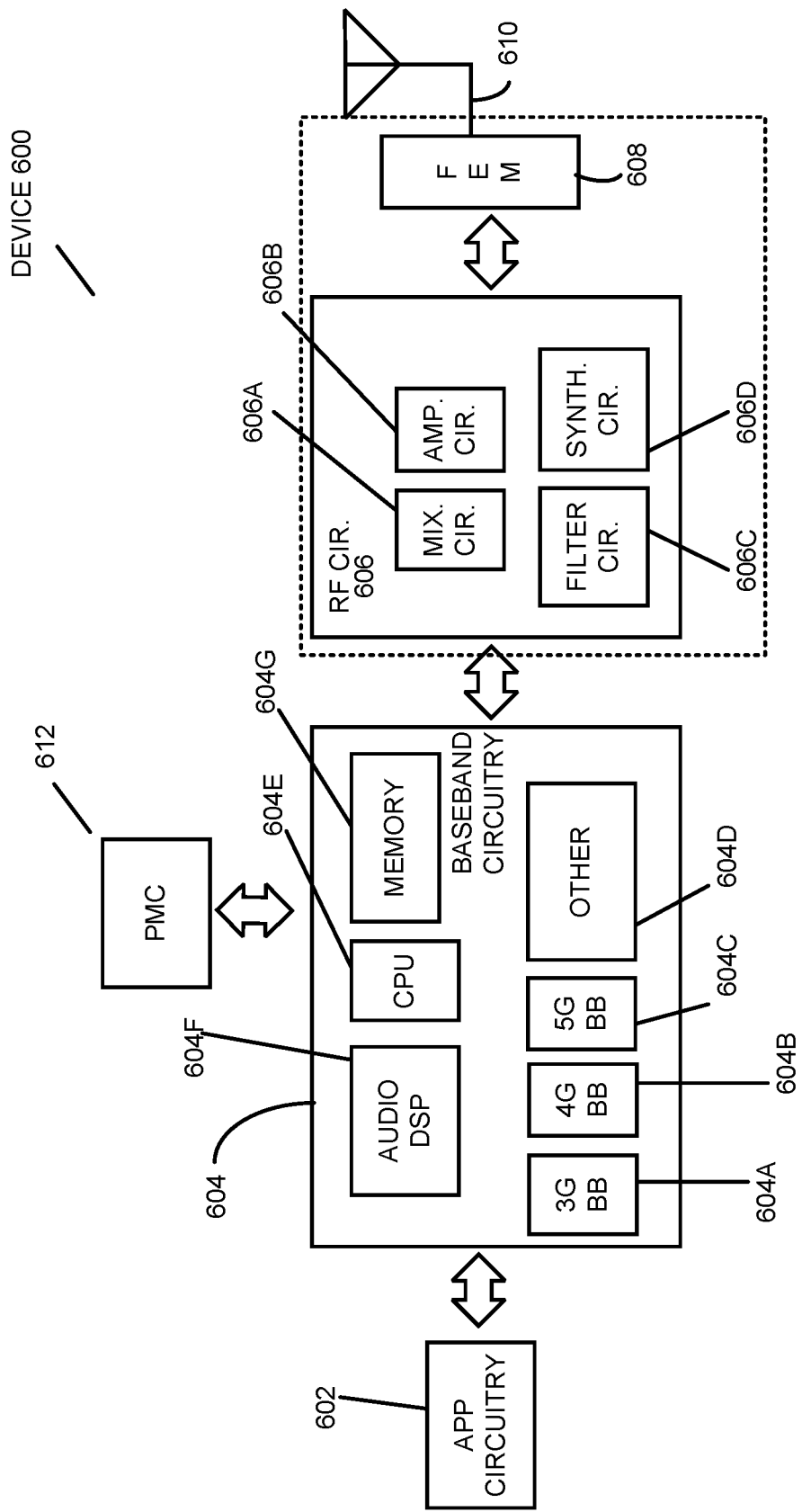
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606*b* and filter circuitry 606*c*. In some embodiments, the transmit signal path of the RF circuitry 606 may include filter circuitry 606*c* and mixer circuitry 606*a*. RF circuitry 606 may also include synthesizer circuitry 606*d* for synthesizing a frequency for use by the mixer circuitry 606*a* of the receive signal path and the transmit signal path. In some embodiments, the mixer circuitry 606*a* of the receive signal path may be configured to down-convert RF signals received from the FEM circuitry 608 based on the synthesized frequency provided by synthesizer circuitry 606*d*. The amplifier circuitry 606*b* may be configured to amplify the down-converted signals and the filter circuitry 606*c* may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606*a* of the receive signal path may comprise passive mixers, although the scope of the embodiments is not limited in this respect.

In some embodiments, the mixer circuitry 606*a* of the transmit signal path may be configured to up-convert input baseband signals based on the synthesized frequency provided by the synthesizer circuitry 606*d* to generate RF output signals for the FEM circuitry 608. The baseband signals may be provided by the baseband circuitry 604 and may be filtered by filter circuitry 606*c*.

In some embodiments, the mixer circuitry 606*a* of the receive signal path and the mixer circuitry 606*a* of the transmit signal path may include two or more mixers and may be arranged for quadrature downconversion and upconversion, respectively. In some embodiments, the mixer circuitry 606*a* of the receive signal path and the mixer circuitry 606*a* of the transmit signal path may include two or more mixers and may be arranged for image rejection (e.g., Hartley image rejection). In some embodiments, the mixer circuitry 606*a* of the receive signal path and the mixer circuitry 606*a* of the transmit signal path may be arranged for direct downconversion and direct upconversion, respectively. In some embodiments, the mixer circuitry 606*a* of the receive signal path and the mixer circuitry 606*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606*d* may be a fractional-N synthesizer or a fractional N/N+1 synthesizer, although the scope of the embodiments is not limited in this respect as other types of frequency synthesizers may be suitable. For example, synthesizer circuitry 606*d* may be a delta-sigma synthesizer, a frequency multiplier, or a synthesizer comprising a phase-locked loop with a frequency divider.

The synthesizer circuitry 606*d* may be configured to synthesize an output frequency for use by the mixer circuitry 606*a* of the RF circuitry 606 based on a frequency input and a divider control input. In some embodiments, the synthesizer circuitry 606*d* may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606*d* of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
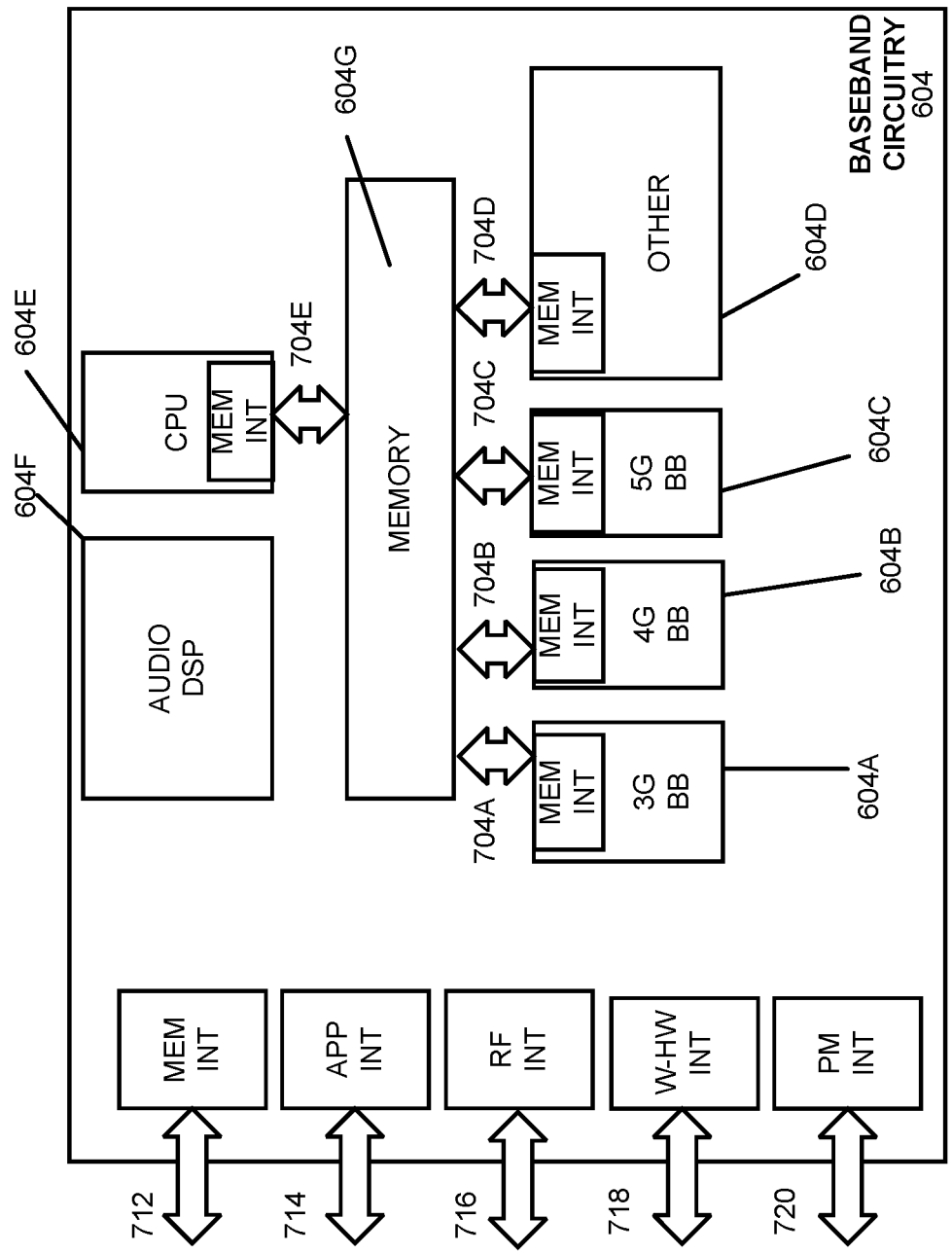
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
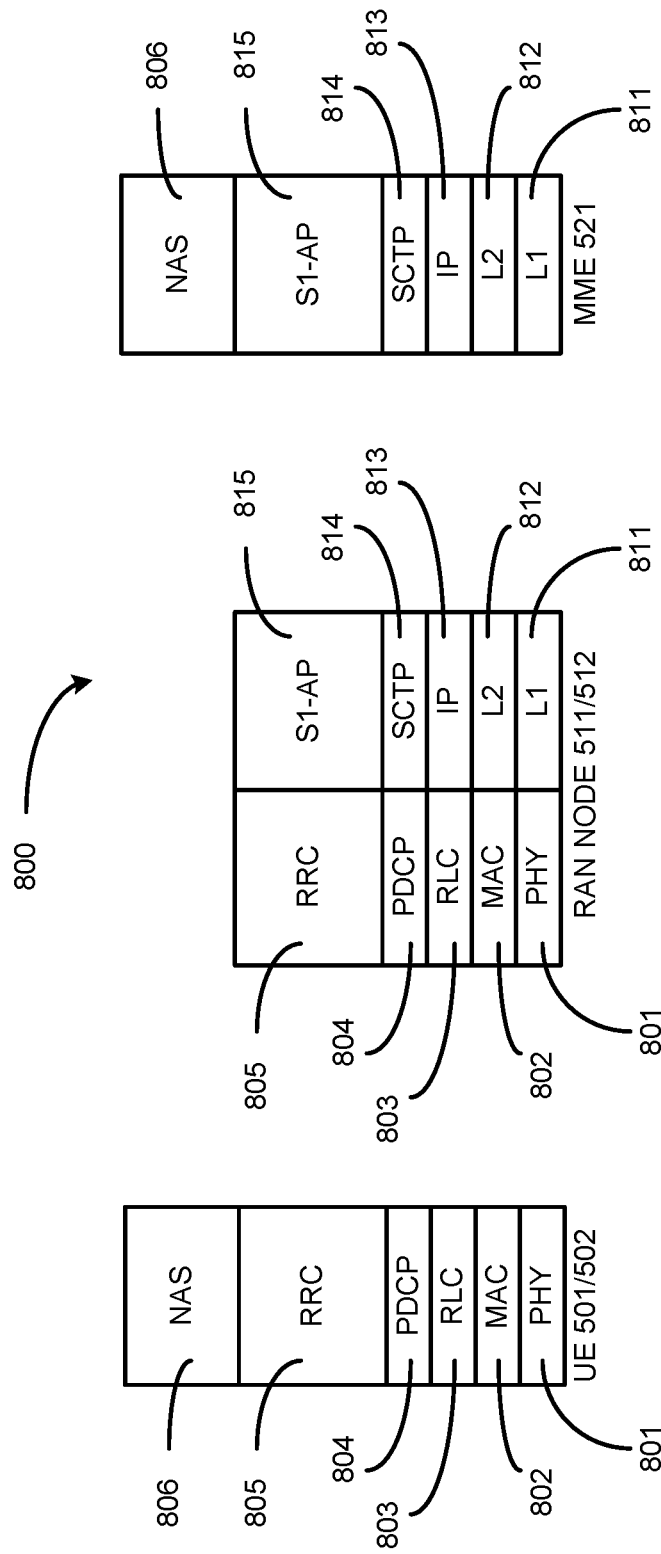
FIG. 8 is an illustration of a control plane protocol stack in accordance with some embodiments.

FIG. 8 is an illustration of a control plane protocol stack in accordance with some embodiments. In this embodiment, a control plane 800 is shown as a communications protocol stack between the UE 501 (or alternatively, the UE 502), the RAN node 511 (or alternatively, the RAN node 512), and the MME 521.

The PHY layer 801 may transmit or receive information used by the MAC layer 802 over one or more air interfaces. The PHY layer 801 may further perform link adaptation or adaptive modulation and coding (AMC), power control, cell search (e.g., for initial synchronization and handover purposes), and other measurements used by higher layers, such as the RRC layer 805. The PHY layer 801 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 802 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer 803 may operate in a plurality of modes of operation, including: Transparent Mode (TM), Unacknowledged Mode (UM), and Acknowledged Mode (AM). The RLC layer 803 may execute transfer of upper layer protocol data units (PDUs), error correction through automatic repeat request (ARQ) for AM data transfers, and concatenation, segmentation and reassembly of RLC SDUs for UM and AM data transfers. The RLC layer 803 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 804 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timerbased discard of data, and perform security operations (e.g., ciphering, deciphering, integrity protection, integrity verification, etc.).

The main services and functions of the RRC layer 805 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 501 and the RAN node 511 may utilize a Uu interface (e.g., an LTE-Uu interface) to exchange control plane data via a protocol stack comprising the PHY layer 801, the MAC layer 802, the RLC layer 803, the PDCP layer 804, and the RRC layer 805.

The non-access stratum (NAS) protocols 806 form the highest stratum of the control plane between the UE 501 and the MME 521. The NAS protocols 806 support the mobility of the UE 501 and the session management procedures to establish and maintain IP connectivity between the UE 501 and the P-GW 523.

The S1 Application Protocol (S1-AP) layer 815 may support the functions of the S1 interface and comprise Elementary Procedures (EPs). An EP is a unit of interaction between the RAN node 511 and the CN 520. The S1-AP layer services may comprise two groups: UE-associated services and non-UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 814 may ensure reliable delivery of signaling messages between the RAN node 511 and the MME 521 based, in part, on the IP protocol, supported by the IP layer 813. The L2 layer 812 and the L1 layer 811 may refer to communication links (e.g., wired or wireless) used by the RAN node and the MME to exchange information.

The RAN node 511 and the MME 521 may utilize an S1-MME interface to exchange control plane data via a protocol stack comprising the L1 layer 811, the L2 layer 812, the IP layer 813, the SCTP layer 814, and the S1-AP layer 815.

Figure 9:
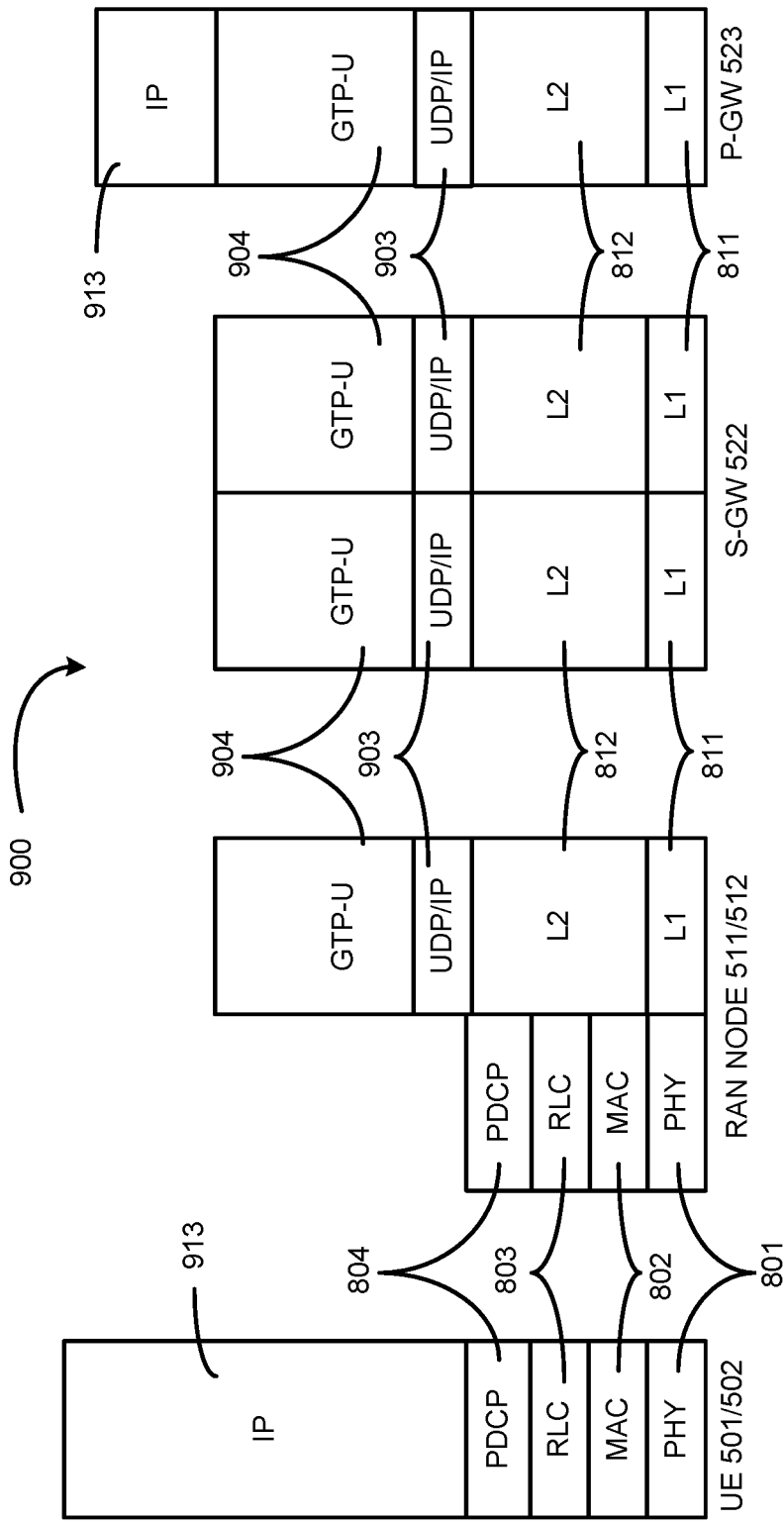
FIG. 9 is an illustration of a user plane protocol stack in accordance with some embodiments.

FIG. 9 is an illustration of a user plane protocol stack in accordance with some embodiments. In this embodiment, a user plane 900 is shown as a communications protocol stack between the UE 501 (or alternatively, the UE 502), the RAN node 511 (or alternatively, the RAN node 512), the S-GW 522, and the P-GW 523. The user plane 900 may utilize at least some of the same protocol layers as the control plane 800. For example, the UE 501 and the RAN node 511 may utilize a Uu interface (e.g., an LTE-Uu interface) to exchange user plane data via a protocol stack comprising the PHY layer 801, the MAC layer 802, the RLC layer 803, the PDCP layer 804.

The General Packet Radio Service (GPRS) Tunneling Protocol for the user plane (GTP-U) layer 904 may be used for carrying user data within the GPRS core network and between the radio access network and the core network. The user data transported can be packets in any of IPv4, IPv6, or PPP formats, for example. The UDP and IP security (UDP/IP) layer 913 may provide checksums for data integrity, port numbers for addressing different functions at the source and destination, and encryption and authentication on the selected data flows. The RAN node 511 and the S-GW 522 may utilize an S1-U interface to exchange user plane data via a protocol stack comprising the L1 layer 811, the L2 layer 812, the UDP/IP layer 913, and the GTP-U layer 904. The S-GW 522 and the P-GW 523 may utilize an S5/S8a interface to exchange user plane data via a protocol stack comprising the L1 layer 811, the L2 layer 812, the UDP/IP layer 913, and the GTP-U layer 904. As discussed above with respect to FIG. 8, NAS protocols support the mobility of the UE 501 and the session management procedures to establish and maintain IP connectivity between the UE 501 and the P-GW 523.

Figure 10:
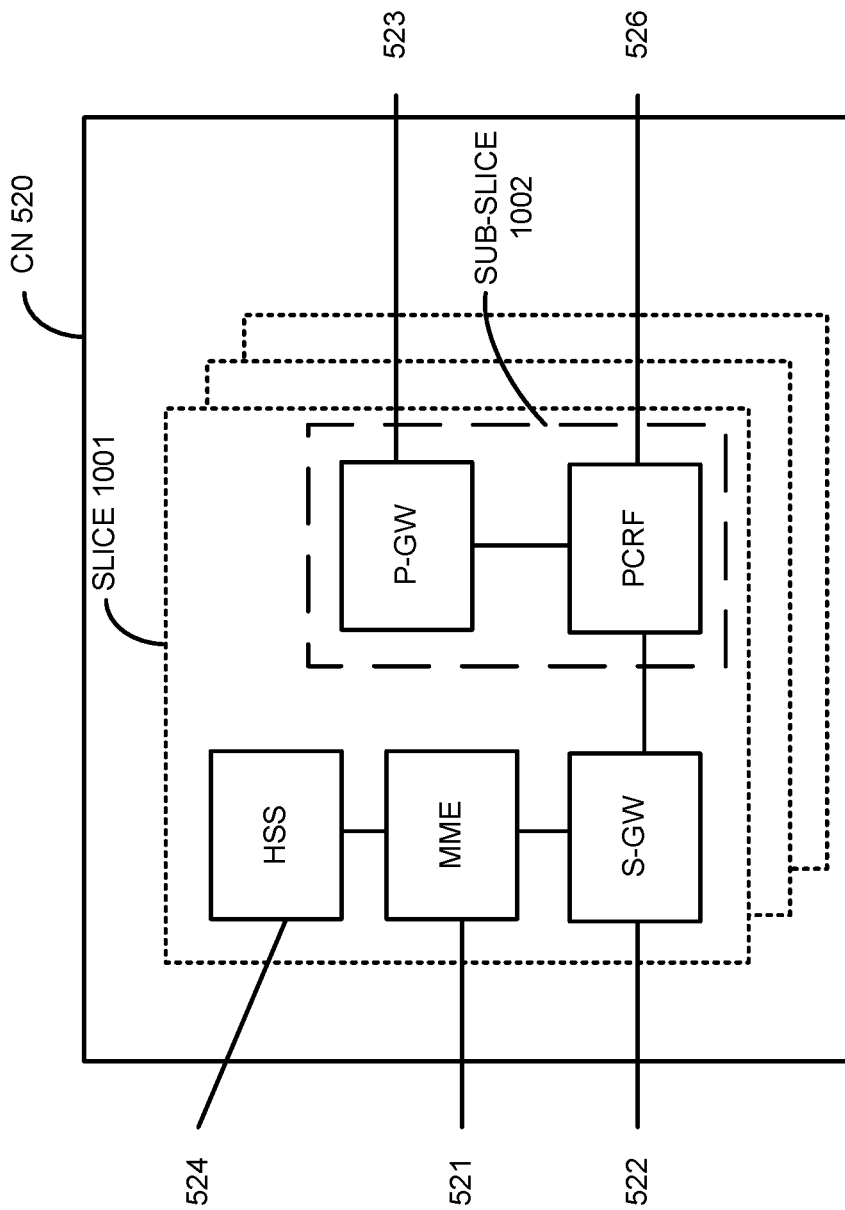
FIG. 10 illustrates components of a core network in accordance with some embodiments.

FIG. 10 illustrates components of a core network in accordance with some embodiments. The components of the CN 520 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 520 may be referred to as a network slice 1001. A logical instantiation of a portion of the CN 520 may be referred to as a network sub-slice 1002 (e.g., the network sub-slice 1002 is shown to include the PGW 523 and the PCRF 526).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 11:
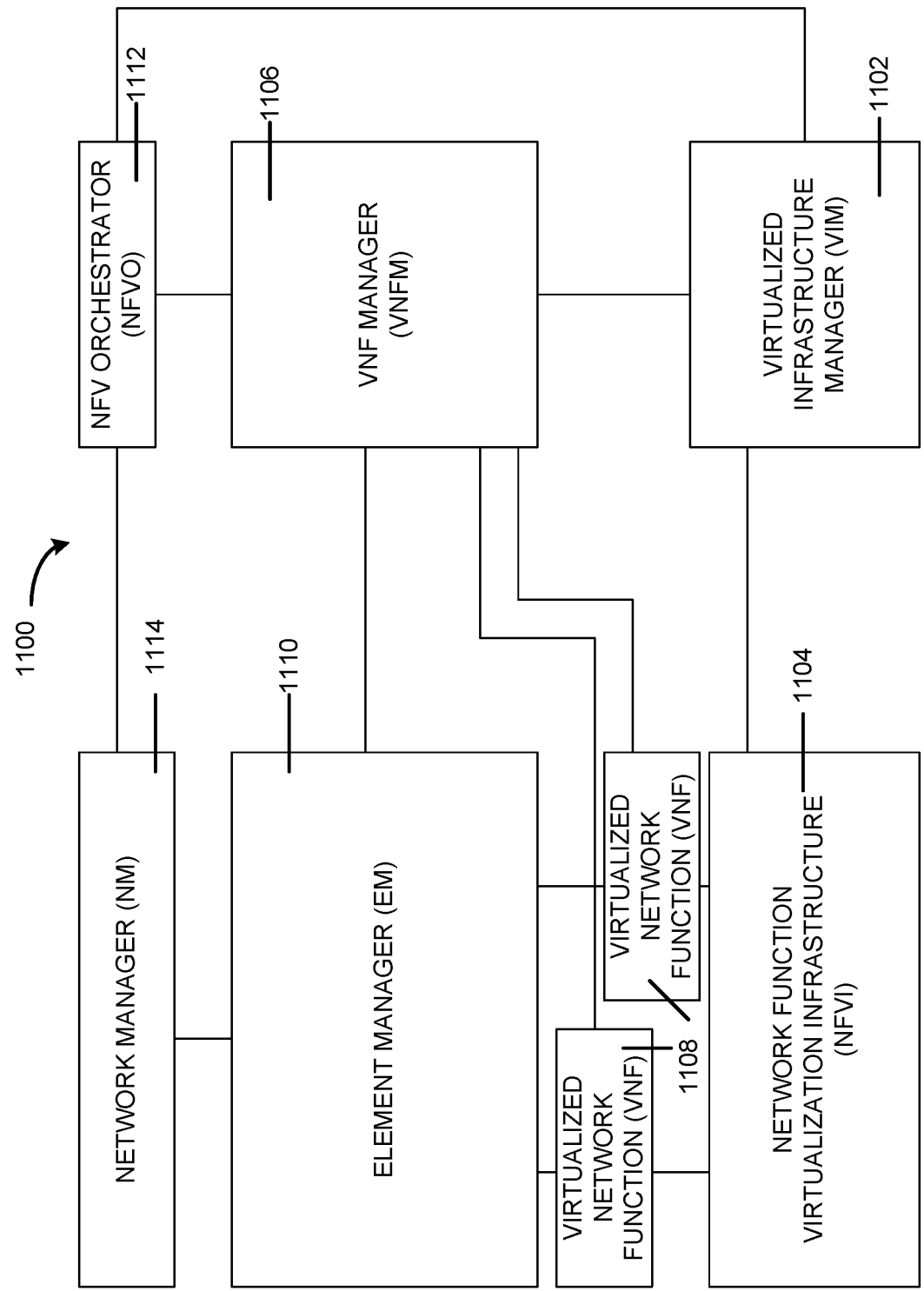
FIG. 11 is a block diagram illustrating components, according to some embodiments, of a system to support network function virtualization (NFV).

FIG. 11 is a block diagram illustrating components, according to some example embodiments, of a system 1100 to support NFV. The system 1100 is illustrated as including a virtualized infrastructure manager (VIM) 1102, a network function virtualization infrastructure (NFVI) 1104, a VNF manager (VNFM) 1106, virtualized network functions (VNFs) 1108, an element manager (EM) 1110, an NFV Orchestrator (NFVO) 1112, and a network manager (NM) 1114.

The VIM 1102 manages the resources of the NFVI 1104. The NFVI 1104 can include physical or virtual resources and applications (including hypervisors) used to execute the system 1100. The VIM 1102 may manage the life cycle of virtual resources with the NFVI 1104 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1106 may manage the VNFs 1108. The VNFs 1108 may be used to execute EPC components/functions. The VNFM 1106 may manage the life cycle of the VNFs 1108 and track performance, fault and security of the virtual aspects of VNFs 1108. The EM 1110 may track the performance, fault and security of the functional aspects of VNFs 1108. The tracking data from the VNFM 1106 and the EM 1110 may comprise, for example, performance measurement (PM) data used by the VIM 1102 or the NFVI 1104. Both the VNFM 1106 and the EM 1110 can scale up/down the quantity of VNFs of the system 1100.

The NFVO 1112 may coordinate, authorize, release and engage resources of the NFVI 1104 in order to provide the requested service (e.g., to execute an EPC function, component, or slice). The NM 1114 may provide a package of end-user functions with the responsibility for the management of a network, which may include network elements with VNFs, non-virtualized network functions, or both (management of the VNFs may occur via the EM 1110).

Figure 12:
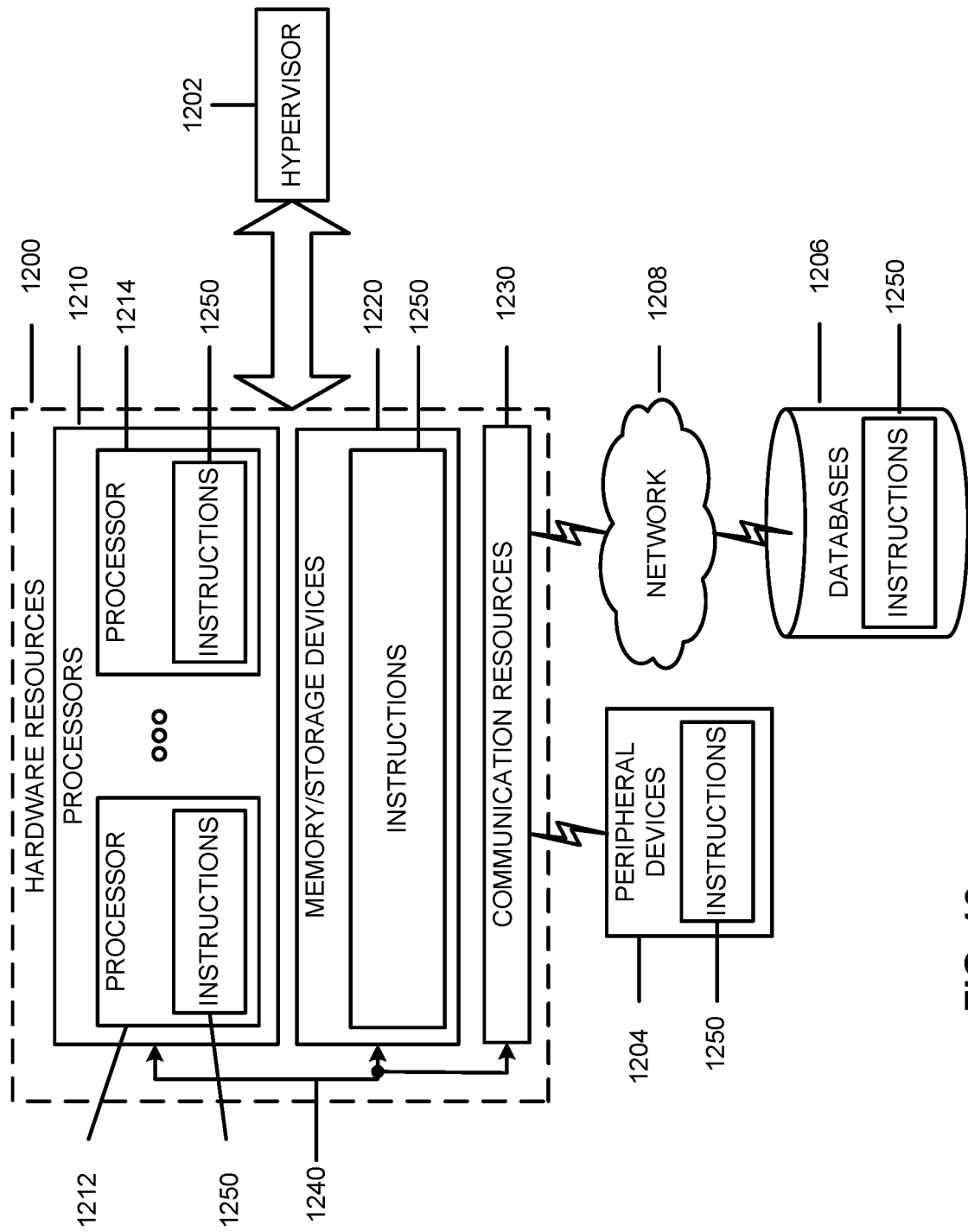
FIG. 12 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

In various embodiments, the devices/components of FIGS. 5, 6, 8, 9, 10, 11, 12, and particularly the baseband circuitry of FIG. 7, may be used for: processing configuration information from a next-generation nodeB (gNB); determining, based on the configuration information, a type of reference signal (RS) to be used for radio link monitoring (RLM); and performing RLM based on the determined type of RS to be used for RLM. The devices/components of FIGS. 5-12 may also be used to practice, in whole or in part, any of the operation flow/algorithmic structures depicted in FIGS. 1-4.

EXAMPLES

Some non-limiting examples are provided below.

Example 1 includes one or more non-transitory computer-readable media storing instructions, that, when executed by one or more processors, cause a user equipment (UE) to: process configuration information from a next-generation nodeB (gNB); determine, based on the configuration information, a type of reference signal (RS) to be used for radio link monitoring (RLM); and perform RLM based on the determined type of RS to be used for RLM.

Example 2 includes the one or more non-transitory computer-readable media of example 1 or some other example herein, wherein the RS is a synchronization signal block (SSB) or a channel state information-reference signal (CSI-RS).

Example 3 includes the one or more non-transitory computer-readable media of example 1 or some other example herein, wherein the configuration information is to indicate a slot, symbol, or index of an RS to be used for RLM.

Example 4 includes the one or more non-transitory computer-readable media of example 1 or some other example herein, wherein the configuration information is to indicate a number of RSs, which have a highest reference signal receive power (RSRP), that are to be used for RLM.

Example 5 includes the one or more non-transitory computer-readable media of example 1 or some other example herein, wherein the configuration information is to include a bitmap to indicate synchronization signal blocks (SSBs) that are to be used for RLM.

Example 6 includes one or more non-transitory, computer-readable media having instructions that, when executed, cause a user equipment (UE) to: determine, based on a signal from a network, an indication that a radio link monitoring-reference signal (RLM-RS) and a physical downlink control channel (PDCCH) signal are both configured with a first beamforming configuration for an evaluation period; and evaluate the RLM-RS for the evaluation period based on the first beamforming configuration.

Example 7 includes the one or more non-transitory computer-readable media of example 6 or some other example herein, wherein the instructions, when executed further cause the UE to: determine a quality of a connection between the UE and a next generation nodeB (gNB) based on evaluation of the RLM-RSs; and determine an out-of-sync state or in-sync state of the PDCCH based on the determined quality of the connection.

Example 8 includes the one or more non-transitory computer-readable media of example 6 or some other example herein, wherein the PDCCH is a cell-specific PDCCH, a UE-specific PDCCH, or a machine-type communications physical downlink control channel (MPDCCH).

Example 9 includes the one or more non-transitory computer-readable media of example 6 or some other example herein, wherein the first beamforming configuration is a transmit beamforming configuration associated with a next generation nodeB (gNB) of the network.

Example 10 includes the one or more non-transitory computer-readable media of example 6 or some other example herein, wherein the first beamforming configuration is a receive beamforming configuration associated with the UE.

Example 11 includes the one or more non-transitory computer-readable media of example 6 or some other example herein, wherein the evaluation period is at least one subframe.

Example 12 includes the one or more non-transitory computer-readable media of example 6 or some other example herein, wherein the evaluation period is at least one time slot.

Example 13 includes the one or more non-transitory computer-readable media of example 6 or some other example herein, wherein the RLM-RS is a synchronization signal block (SSB) or a channel state information-reference signal (CSI-RS).

Example 14 includes the one or more non-transitory computer-readable media of example 6 or some other example herein, wherein the instructions, when executed, further cause the UE to: determine, based on the signal from the network, which RLM-RSs of a plurality of RLM-RSs, and which PDCCH signals of a plurality of PDCCH signals, are configured with the first beamforming configuration for the evaluation period.

Example 15 includes An apparatus comprising: memory to store configuration information to identify a type of reference signal (RS) to be used for radio link monitoring (RLM) for a user equipment (UE); and processing circuitry, coupled with the memory, to: generate a message containing the configuration information; and transmit or cause to transmit the message to the UE.

Example 16 includes the apparatus of example 15 or some other example herein, wherein the RS is a synchronization signal block (SSB) or a channel state information-reference signal (CSI-RS).

Example 17 includes the apparatus of example 15 or some other example herein, wherein the configuration information is to indicate a slot, symbol, or index of an RS to be used for RLM.

Example 18 includes the apparatus of example 15 or some other example herein, wherein the configuration information is to indicate a number of RSs, which have a highest reference signal receive power (RSRP), that are to be used for RLM.

Example 19 includes the apparatus of example 15 or some other example herein, wherein the configuration information is to include a bitmap to indicate synchronization signal blocks (SSBs) that are to be used for RLM.

Example 20 includes one or more non-transitory, computer-readable media having instructions that, when executed, cause a next-generation nodeB (gNB) to: generate a signal containing an indication that a radio link monitoring-reference signal (RLM-RS) and a physical downlink control channel (PDCCH) signal are both configured with a first beamforming configuration for an evaluation period; and transmit or cause to transmit the signal over a network to a user equipment (UE) to cause the UE to evaluate the RLM-RS for the evaluation period based on the first beamforming configuration.

Example 21 includes the one or more non-transitory computer-readable media of example 20 or some other example herein, wherein the PDCCH is a cell-specific PDCCH, a UE-specific PDCCH, or a machine-type communications physical downlink control channel (MPDCCH).

Example 22 includes the one or more non-transitory computer-readable media of example 20 or some other example herein, wherein the first beamforming configuration is a transmit beamforming configuration associated with a gNB of the network or a receive beamforming configuration associated with the UE.

Example 23 includes the one or more non-transitory computer-readable media of example 20 or some other example herein, wherein the evaluation period is at least one subframe or at least one time slot.

Example 24 includes the one or more non-transitory computer-readable media of example 20 or some other example herein, wherein the RLM-RS is a synchronization signal block (SSB) or a channel state information-reference signal (CSI-RS).

Example 25 includes a method comprising: processing configuration information from a next-generation nodeB (gNB); determining, based on the configuration information, a type of reference signal (RS) to be used for radio link monitoring (RLM); and performing RLM based on the determined type of RS to be used for RLM.

Example 26 includes the method of example 25 or some other example herein, wherein the RS is a synchronization signal block (SSB) or a channel state information-reference signal (CSI-RS).

Example 27 includes the method of example 25 or some other example herein, wherein the configuration information is to indicate a slot, symbol, or index of an RS to be used for RLM.

Example 28 includes the method of example 25 or some other example herein, wherein the configuration information is to indicate a number of RSs, which have a highest reference signal receive power (RSRP), that are to be used for RLM.

Example 29 includes the method of example 25 or some other example herein, wherein the configuration information is to include a bitmap to indicate synchronization signal blocks (SSBs) that are to be used for RLM.

Example 30 includes a method comprising: determining, based on a signal from a network, an indication that a radio link monitoring-reference signal (RLM-RS) and a physical downlink control channel (PDCCH) signal are both configured with a first beamforming configuration for an evaluation period; and evaluating the RLM-RS for the evaluation period based on the first beamforming configuration.

Example 31 includes the method of example 30 or some other example herein, further comprising: determining a quality of a connection between the UE and a next generation nodeB (gNB) based on evaluation of the RLM-RSs; and determining an out-of-sync state or in-sync state of the PDCCH based on the determined quality of the connection.

Example 32 includes the method of example 30 or some other example herein, wherein the PDCCH is a cell-specific PDCCH, a UE-specific PDCCH, or a machine-type communications physical downlink control channel (MPDCCH).

Example 33 includes the method of example 30 or some other example herein, wherein the first beamforming configuration is a transmit beamforming configuration associated with a next generation nodeB (gNB) of the network.

Example 34 includes the method of example 30 or some other example herein, wherein the first beamforming configuration is a receive beamforming configuration associated with the UE.

Example 35 includes the method of example 30 or some other example herein, wherein the evaluation period is at least one subframe.

Example 36 includes the method of example 30 or some other example herein, wherein the evaluation period is at least one time slot.

Example 37 includes the method of example 30 or some other example herein, wherein the RLM-RS is a synchronization signal block (SSB) or a channel state information-reference signal (CSI-RS).

Example 38 includes the method of example 30 or some other example herein, further comprising: determining, based on the signal from the network, which RLM-RSs of a plurality of RLM-RSs, and which PDCCH signals of a plurality of PDCCH signals, are configured with the first beamforming configuration for the evaluation period.

Example 39 includes a method comprising: generating a message containing configuration information identifying a type of reference signal (RS) to be used for radio link monitoring (RLM) for a user equipment (UE); and transmitting or causing to transmit the message to the UE.

Example 40 includes the method of example 39 or some other example herein, wherein the RS is a synchronization signal block (SSB) or a channel state information-reference signal (CSI-RS).

Example 41 includes the method of example 39 or some other example herein, wherein the configuration information is to indicate a slot, symbol, or index of an RS to be used for RLM.

Example 42 includes the method of example 39 or some other example herein, wherein the configuration information is to indicate a number of RSs, which have a highest reference signal receive power (RSRP), that are to be used for RLM.

Example 43 includes the method of example 39 or some other example herein, wherein the configuration information is to include a bitmap to indicate synchronization signal blocks (SSBs) that are to be used for RLM.

Example 44 includes a method comprising: generating a signal containing an indication that a radio link monitoring-reference signal (RLM-RS) and a physical downlink control channel (PDCCH) signal are both configured with a first beamforming configuration for an evaluation period; and transmitting or causing to transmit the signal over a network to a user equipment (UE) to cause the UE to evaluate the RLM-RS for the evaluation period based on the first beamforming configuration.

Example 45 includes the method of example 44 or some other example herein, wherein the PDCCH is a cell-specific PDCCH, a UE-specific PDCCH, or a machine-type communications physical downlink control channel (MPDCCH).

Example 46 includes the method of example 44 or some other example herein, wherein the first beamforming configuration is a transmit beamforming configuration associated with a gNB of the network or a receive beamforming configuration associated with the UE.

Example 47 includes the method of example 44 or some other example herein, wherein the evaluation period is at least one subframe or at least one time slot.

Example 48 includes the method of example 44 or some other example herein, wherein the RLM-RS is a synchronization signal block (SSB) or a channel state information-reference signal (CSI-RS).

Example 49 may include an apparatus comprising means to perform one or more elements of a method described in or related to any of examples 25-48, or any other method or process described herein.

Example 50 may include one or more non-transitory computer-readable media comprising instructions to cause an electronic device, upon execution of the instructions by one or more processors of the electronic device, to perform one or more elements of a method described in or related to any of examples 25-48, or any other method or process described herein.

Example 51 may include an apparatus comprising logic, modules, and/or circuitry to perform one or more elements of a method described in or related to any of examples 25-48, or any other method or process described herein.

Example 52 may include a method, technique, or process as described in or related to any of examples 25-48, or portions or parts thereof.

Example 53 may include an apparatus comprising: one or more processors and one or more computer-readable media comprising instructions that, when executed by the one or more processors, cause the one or more processors to perform the method, techniques, or process as described in or related to any of examples 25-48, or portions thereof.

Example 54 may include a method of communicating in a wireless network as shown and described herein.

Example 55 may include a system for providing wireless communication as shown and described herein.

Example 56 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. One or more non-transitory, computer-readable media having instructions that, when executed, cause a user equipment (UE) to:
   receive, from a network, an indication regarding a plurality of reference signals (RSs), wherein the indication indicates a first type of RSs of the plurality of RSs are to be evaluated, and a second type of RSs of the plurality of RSs are not to be evaluated, wherein the first type is selected as one of a synchronization sequence block (SSB) type or a channel state information-reference signal (CSI-RS) type, and the second type of RSs is different from the first type of RSs;
   determine, based on the received indication that the plurality of RSs and a physical downlink control channel (PDCCH) signal are configured with a beamforming configuration for an evaluation period, wherein the beamforming configuration is a same beamforming configuration associated with a hypothetical PDCCH transmission; and
   evaluate the first type of RSs for the evaluation period by comparing the first type of RSs with the hypothetical PDCCH transmission based on the beamforming configuration.

2. The one or more non-transitory, computer-readable media of claim 1, wherein the instructions, when executed further cause the UE to:
   determine a quality of a connection between the UE and a base station based on the evaluation of the plurality of RSs; and
   determine an out-of-sync state or in-sync state of the PDCCH based on the determined quality of the connection.

3. The one or more non-transitory, computer-readable media of claim 1, wherein the PDCCH is a cell-specific PDCCH, a UE-specific PDCCH, or a machine-type communications physical downlink control channel (MPDCCH).

4. The one or more non-transitory, computer-readable media of claim 1, wherein the beamforming configuration is a transmit beamforming configuration associated with a base station of the network, or a receive beamforming configuration associated with the UE.

5. The one or more non-transitory, computer-readable media of claim 1, wherein the evaluation period is at least one subframe or at least one time slot.

6. The one or more non-transitory, computer-readable media of claim 1, wherein the plurality of RSs further include a CSI-RS.

7. The one or more non-transitory, computer-readable media of claim 1, wherein the instructions, when executed, further cause the UE to:
   determine, based on the signal from the network, which RSs of the plurality of RSs, and which PDCCH signals of a plurality of PDCCH signals, are configured with the beamforming configuration for the evaluation period.

8. One or more non-transitory, computer-readable media having instructions that, when executed, cause a base station to:
   generate an indication regarding a plurality of reference signals (RSs), wherein the plurality of RSs and a physical downlink control channel (PDCCH) signal are configured with a beamforming configuration for an evaluation period, wherein the beamforming configuration is a same beamforming configuration associated with a hypothetical PDCCH transmission, wherein the indication indicates a first type of RSs of the plurality of RSs are to be evaluated, and a second type of RSs of the plurality of RSs are not to be evaluated, wherein the first type is selected as one of a synchronization sequence block (SSB) type or a channel state information-reference signal (CSI-RS) type, and the second type of RSs is different from the first type of RSs; and
   transmit or cause to transmit the plurality of RSs over a network to a user equipment (UE) to cause the UE to evaluate the first type of RSs for the evaluation period by comparing the first type of RSs with the hypothetical PDCCH transmission based on the beamforming configuration.

9. The one or more non-transitory, computer-readable media of claim 8, wherein the PDCCH is a cell-specific PDCCH, a UE-specific PDCCH, or a machine-type communications physical downlink control channel (MPDCCH).

10. The one or more non-transitory, computer-readable media of claim 8, wherein the beamforming configuration is a transmit beamforming configuration associated with the base station of the network or a receive beamforming configuration associated with the UE.

11. The one or more non-transitory, computer-readable media of claim 8, wherein the evaluation period is at least one subframe or at least one time slot.

12. The one or more non-transitory, computer-readable media of claim 8, wherein the plurality of RSs further include a CSI-RS.

13. The one or more non-transitory, computer-readable media of claim 8, wherein the beamforming configuration information is to include a bitmap to indicate synchronization signal blocks (SSBs) that are to be used for the plurality of RSs.

14. The one or more non-transitory, computer-readable media of claim 1, wherein the instructions, when executed further cause the UE to evaluate the plurality of RSs for the evaluation period to produce a signal quality metric, and further map the signal quality metric to a block error rate (BLER) associated with the hypothetical PDCCH transmission.

15. The one or more non-transitory, computer-readable media of claim 14, wherein the BLER of the hypothetical PDCCH transmission is used to determine an out-of-sync (OOS) or in-sync (IS) state of the PDCCH signal.

16. An apparatus comprising:
   a memory to store a beamforming configuration and an indication, wherein a plurality of reference signals (RSs) and a physical downlink control channel (PDCCH) signal are configured with the beamforming configuration for an evaluation period, wherein the beamforming configuration is a same beamforming configuration associated with a hypothetical PDCCH transmission used to evaluate the plurality of RSs, wherein the indication indicates a first type of RSs of the plurality of RSs are to be evaluated, and a second type of RSs of the plurality of RSs are not to be evaluated, wherein the first type is selected as one of a synchronization sequence block (SSB) type or a channel state information-reference signal (CSI-RS) type, and the second type of RSs is different from the first type of RSs; and
   processing circuitry, coupled with the memory, to:
      evaluate the first type of RSs for the evaluation period by comparing the first type of RSs with the hypothetical PDCCH transmission based on the beamforming configuration.

17. The apparatus of claim 16, wherein the beamforming configuration for the plurality of RSs includes base station transmit (Tx) beamforming configuration information and UE receive (Rx) beamforming configuration information.

18. The apparatus of claim 16, wherein to evaluate the first type of RSs for the evaluation period, the processing circuitry is to evaluate the plurality of RSs for the evaluation period to produce a signal quality metric, and further map the signal quality metric to a block error rate (BLER) of the hypothetical PDCCH transmission.

19. The apparatus of claim 16, wherein the plurality of RSs include a CSI-RS.

20. The apparatus of claim 16, wherein the evaluation period is at least one subframe or at least one time slot.

21. The one or more non-transitory, computer-readable media of claim 1, wherein the first type of RSs include RSs with a number of highest Reference Signal Received Powers (RSRPs).

22. The one or more non-transitory, computer-readable media of claim 8, wherein the first type of RSs include RSs with a number of highest Reference Signal Received Powers (RSRPs).

23. The apparatus of claim 16, wherein the first type of RSs include RSs with a number of highest Reference Signal Received Powers (RSRPs).

* * * * *